US011827759B2

(12) United States Patent
Oka et al.

(10) Patent No.: US 11,827,759 B2
(45) Date of Patent: Nov. 28, 2023

(54) FIBER-REINFORCED MOLDED ARTICLE AND METHOD OF PRODUCING SAME

(71) Applicant: Toray Industries, Inc., Tokyo (JP)

(72) Inventors: Hideki Oka, Nagoya (JP); Atsuhisa Suzuki, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 722 days.

(21) Appl. No.: 16/965,764

(22) PCT Filed: Jan. 28, 2019

(86) PCT No.: PCT/JP2019/002676
§ 371 (c)(1),
(2) Date: Jul. 29, 2020

(87) PCT Pub. No.: WO2019/151174
PCT Pub. Date: Aug. 8, 2019

(65) Prior Publication Data
US 2021/0032419 A1    Feb. 4, 2021

(30) Foreign Application Priority Data

Jan. 31, 2018  (JP) ................................. 2018-014721
Jan. 31, 2018  (JP) ................................. 2018-014722

(51) Int. Cl.
*C08J 5/04*     (2006.01)
*B29C 70/52*    (2006.01)
(Continued)

(52) U.S. Cl.
CPC ............... *C08J 5/043* (2013.01); *B29C 70/52* (2013.01); *C08G 59/5073* (2013.01);
(Continued)

(58) Field of Classification Search
CPC ............ H01B 3/40; H01B 3/47; H01B 13/00; H01B 7/18; C08L 63/00; C08J 5/043;
(Continued)

(56) References Cited

U.S. PATENT DOCUMENTS 9,834,670 B2   12/2017   Mizuki et al.
10,696,805 B2   6/2020   Mori et al.
(Continued)

FOREIGN PATENT DOCUMENTS

EP   1 621 323 A1   2/2006
JP   06-190930 A    7/1994
(Continued)

OTHER PUBLICATIONS

Collector's Corner, Mohs Hardness Scale, accessed online May 17, 2023.*

(Continued)

*Primary Examiner* — Camie S Thompson
(74) *Attorney, Agent, or Firm* — DLA Piper LLP (US)

(57) ABSTRACT

A fiber-reinforced shaped article in which a reinforcing fiber bundle aggregate formed of a plurality of reinforcing fiber bundles converged is impregnated with an epoxy resin composition and the epoxy resin composition is cured, wherein the epoxy resin composition contains at least components [A], [B], [C], and [D], and a quantity of [A] is 60 to 100 parts by mass per 100 parts by mass of all epoxy resin contained in the epoxy resin composition: [A]: aminophenol type epoxy resin; [B]: two kinds of acid anhydrides of [B1]: acid anhydride having a nadic anhydride structure, and [B2]: acid anhydride having a hydrogenated structure of phthalic anhydride; [C]: at least one filler having a Mohs hardness of 3 or less selected from the group consisting of a silicon (Continued)

compound, a magnesium compound, a calcium compound, an aluminum compound, and inorganic carbon; [D]: a release agent.

7 Claims, 5 Drawing Sheets

(51) Int. Cl.
- *C08G 59/50* (2006.01)
- *C08K 3/36* (2006.01)
- *C08J 5/24* (2006.01)
- *B29K 63/00* (2006.01)
- *B29K 307/04* (2006.01)
- *B29K 309/08* (2006.01)
- *B29K 507/04* (2006.01)

(52) U.S. Cl.
CPC ............... *C08J 5/042* (2013.01); *C08J 5/048* (2013.01); *C08J 5/243* (2021.05); *C08J 5/249* (2021.05); *C08K 3/36* (2013.01); *B29K 2063/00* (2013.01); *B29K 2307/04* (2013.01); *B29K 2309/08* (2013.01); *B29K 2507/04* (2013.01); *C08J 2363/00* (2013.01)

(58) Field of Classification Search
CPC ............ C08J 5/249; C08J 5/243; C08J 5/042; C08J 5/048; C08J 2363/00; C08J 7/04; B29K 2309/08; B29K 2507/04; B29K 2307/04; B29K 2063/00; C08K 3/36; C08K 3/34; C08K 3/013; C08G 9/5073; C08G 59/42; C08G 59/5073; B29C 70/52
USPC ................................ 428/299.1, 299.4, 298.1
See application file for complete search history.

(56) References Cited

U.S. PATENT DOCUMENTS

| | | | |
|---|---|---|---|
| 2013/0202873 A1* | 8/2013 | Mizuki | C08L 63/00 |
| | | | 525/92 H |
| 2015/0065606 A1 | 3/2015 | Matsuda et al. | |
| 2015/0210846 A1* | 7/2015 | Qi | H01B 3/40 |
| | | | 523/427 |

FOREIGN PATENT DOCUMENTS

| | | |
|---|---|---|
| JP | 08-1804 A | 1/1996 |
| JP | 2008-38082 A | 2/2008 |
| JP | 2008-508113 A | 3/2008 |
| JP | 2008-88342 A | 4/2008 |
| JP | 2008-290381 A | 12/2008 |
| JP | 2009-66912 A | 4/2009 |
| JP | 2011-89071 A | 5/2011 |
| JP | 2014-201659 A | 10/2014 |
| JP | 2015-3938 A | 1/2015 |
| JP | 2017-008317 A | 1/2017 |
| JP | 2017-119812 A | 7/2017 |
| JP | 2017-119859 A | 7/2017 |
| WO | 2012/039456 A1 | 3/2012 |
| WO | 2013/115152 A1 | 8/2013 |
| WO | 2017/033632 A1 | 3/2017 |

OTHER PUBLICATIONS

Examination Report dated Jan. 19, 2022, of counterpart Indian Patent Application No. 202047036105.

* cited by examiner

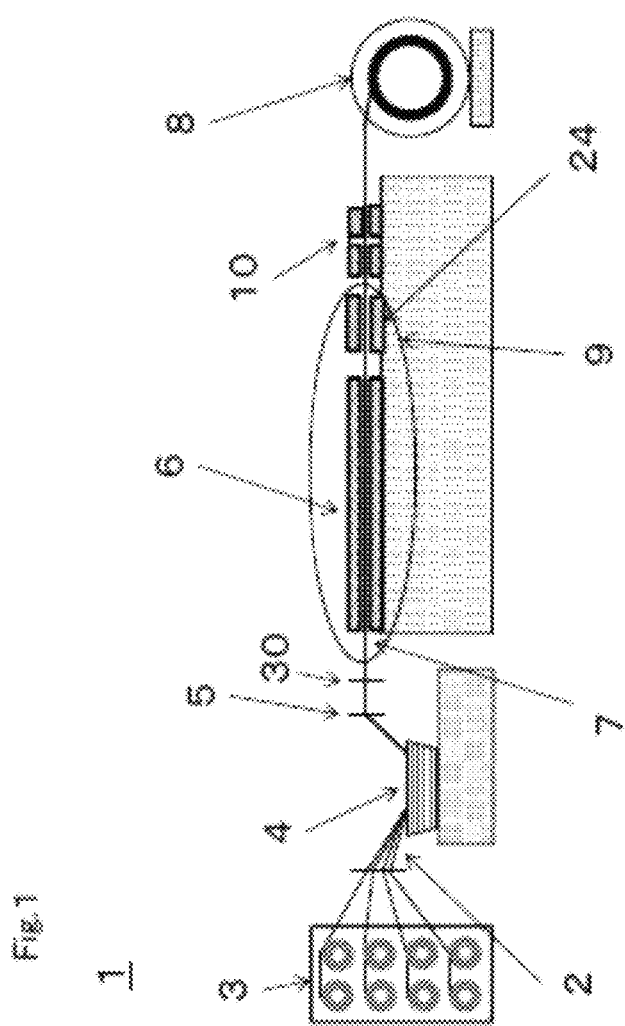

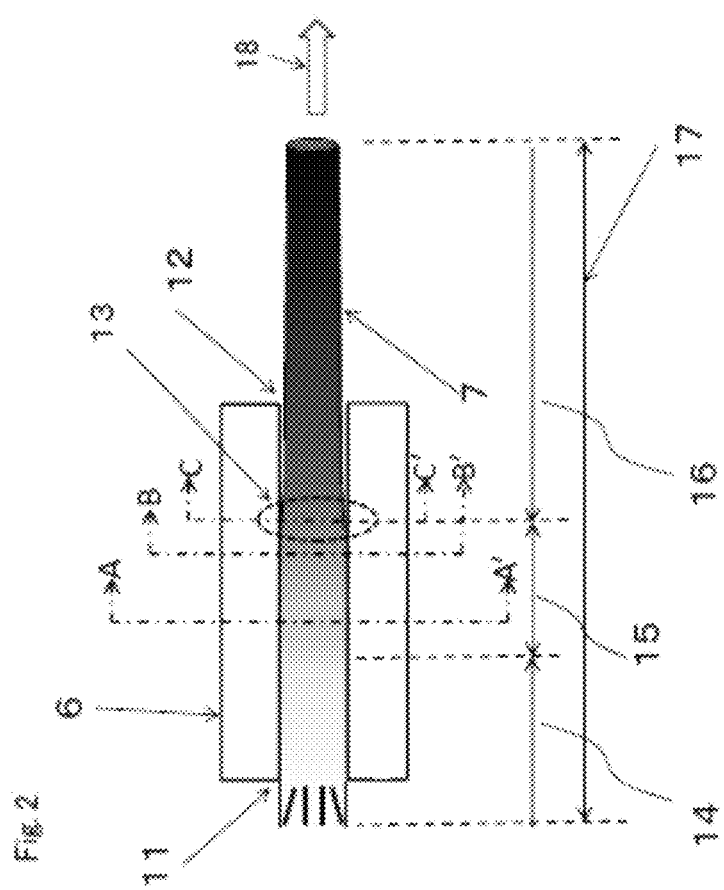

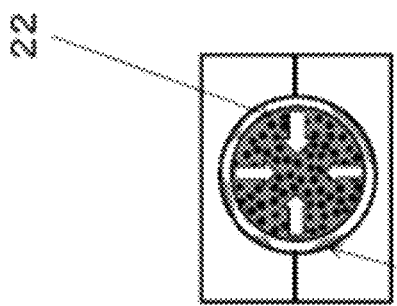
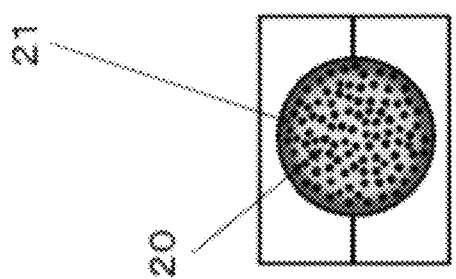
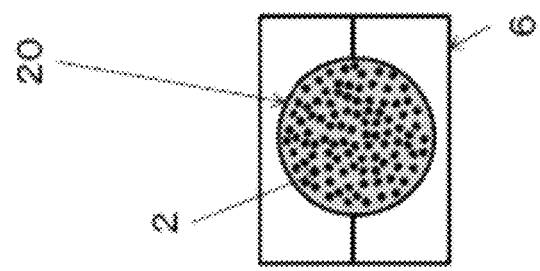
Fig. 3(a)
Fig. 3(b)
Fig. 3(c)

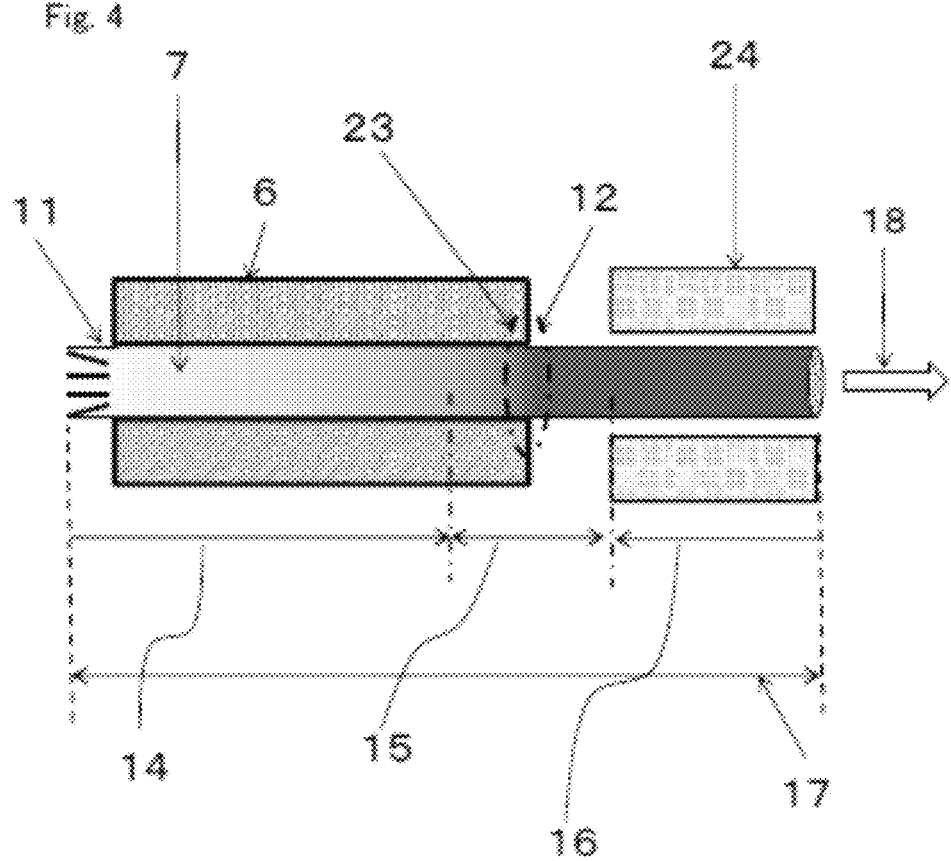

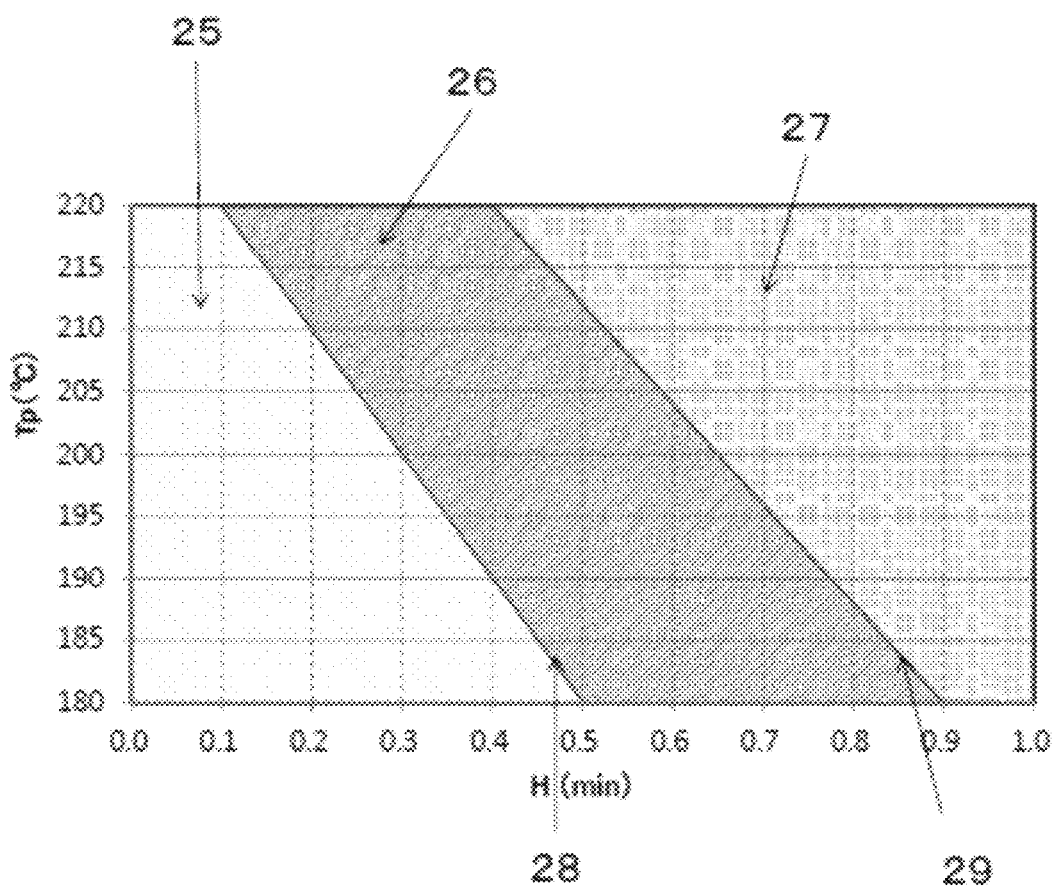

FIBER-REINFORCED MOLDED ARTICLE AND METHOD OF PRODUCING SAME

TECHNICAL FIELD

This disclosure relates to a fiber-reinforced shaped article comprising a resin composition and a method of producing the same.

BACKGROUND

Fiber-reinforced resins composed of reinforcing fibers such as carbon fiber and glass fiber and thermosetting resin such as epoxy resin and phenol resin are lightweight, but are superior in mechanical properties such as strength and rigidity as well as heat resistance and corrosion resistance and, therefore, they have been applied in many fields such as aerospace, automobiles, railway vehicles, ships, civil engineering and sporting goods. Especially, in applications where high performance is required, fiber-reinforced resins using continuous reinforcing fibers are used. Carbon fibers superior in specific strength and specific elastic modulus have been used as the reinforcing fibers, and thermosetting resins have been used as the matrix resin. As the thermosetting resin, epoxy resins superior in adhesiveness to carbon fibers are often used.

As a method of producing a fiber-reinforced resin, methods appropriately selected from among such methods as a prepreg process, a hand lay-up process, a filament winding process, a pultrusion process, and an RTM (Resin Transfer Molding) process have been used.

The following method is often adopted in the pultrusion process.

A reinforcing fiber bundle in which several thousands to several tens of thousands of filaments are arranged in one direction is passed through a resin bath containing a liquid matrix resin to impregnate the reinforcing resin bundle with the matrix resin. Then, the reinforcing fiber bundle impregnated with the matrix resin is passed through a squeeze die and a heating die, and the reinforcing fiber bundle impregnated with the matrix resin is continuously pultruded with a tensile machine and simultaneously the matrix resin is cured.

To perform the pultrusion with high productivity, it is important to allow this step to proceed continuously and constantly. When the resulting shaped article is a shaped article having a smooth surface to smoothly pultrude the shaped article from the die, it is necessary to hold the shaped article in close contact with the die until the resin soaked in the reinforcing fiber bundle is sufficiently cured, or to press it with an appropriate pressure.

The matrix resin to be used for pultrusion is required to have a viscosity low enough to promptly soak into reinforcing fibers in a resin impregnation bath. In addition, the stability of viscosity is important from the viewpoint of continuous productivity for a long time, and depending on the target product, the heat resistance of a cured product is also an important factor.

However, when the material in which the reinforcing fiber bundles are impregnated with the matrix resin ("resin-impregnated fiber base material") is thermoset while being continuously pultruded in the pultrusion die, the matrix resin is cured from a liquid state to transition to a solid state so that curing shrinkage of the matrix resin occur. At that time, a part of the matrix resin may adhere and remain on the inner surface of the pultrusion die. This is a resin residue called scale. When this scale occurs, the pultrusion stress may increase. Also, if the pultrusion is stopped midway and then the pultrusion is moved again, the scale will be ejected, but the stopped part of the resin-impregnated fiber base material may differ in characteristics from other parts or it may be difficult to perform continuous shaping.

Especially, when fiber-reinforced resin is used for electric cable core applications, electric cables are very long conductive wires and electric cable cores are small in cross-sectional area and, therefore, it is an important factor to increase the pultrusion speed by suppressing the generation of scale. To suppress the generation of scale, improvement of curing conditions in a die, improvement of a thermosetting resin composition and the like have been performed.

For example, Japanese Patent Laid-open Publication No. 2015-3938 (claims, paragraph 0055) discloses an epoxy resin composition comprising a phenol novolac type epoxy resin and comprising an aminophenol type epoxy resin and/or a tetraglycidyl amine type epoxy resin as epoxy resins, and comprising methylnadic acid anhydride as an acid anhydride. Further, there is also disclosed a method of producing a shaped article by putting the resin composition into a raw material tank at 25° C., passing carbon fibers through the raw material tank containing the resin composition to impregnate them with the resin, then inserting this into a circular die and heat-curing it at 180° C. for 0.8 min, and after-curing it at 210° C. for 3 min. Further, in an example (paragraph 0093) is disclosed an epoxy resin composition in which 50% by mass of an aminophenol type epoxy resin as an epoxy resin, and methylnadic anhydride and methyltetrahydrophthalic anhydride in a mass ratio of 50/50 are blended. The matrix epoxy resin composition has a low viscosity and is sufficiently soaked into the reinforcing fiber, and the resulting shaped article has high heat resistance.

Japanese Patent Laid-open Publication No. 2017-8317 (claims, paragraph 0018) discloses an epoxy resin composition comprising [A] a bifunctional or higher functional epoxy resin containing an aromatic ring, [B] phthalic anhydride, and [C] at least one acid anhydride selected from the group consisting of tetrahydrophthalic anhydride, methyltetrahydrophthalic anhydride, methylnadic anhydride, hexahydrophthalic anhydride, and methylhexahydrophthalic anhydride. A shaped article that can achieve both tensile strength and heat resistance at a high level can be obtained.

Japanese Patent Laid-open Publication No. 2017-119812 (claims) describes an epoxy resin composition comprising a bifunctional or higher functional epoxy resin containing an aromatic ring and an acid anhydride curing agent. A shaped article that can achieve both heat resistance and tensile strength at a high level can be obtained.

Next, paying attention to a pultrusion apparatus, Japanese Patent Laid-open Publication No. 2008-290381 (paragraph 0039, FIG. 1) discloses a shaping apparatus comprising three dies including a first die to pull fibrous yarns impregnated with a thermosetting resin composition into a die, a second die, and a third die from which a pultruded article is finally pulled out, wherein the curing temperature can be independently controlled in each die, and a difference in temperature range is provided among the dies. JP '381 (paragraph 0041) describes that by dividing the heating region into two or more stages, it is possible to suppress gelation near the inlet and simultaneously increase the degree of cure of the fiber-reinforced resin composition by subsequent heating.

Japanese Patent Laid-open Publication No. 2014-201659 (paragraph 0027) describes a pultrusion process. The die temperature is about 100 to 250° C., and it is preferable to set the temperature to be low at the die inlet and raise it gradually toward the rear side of the die to the curing temperature, and after-curing is carried out at 130 to 150° C. even if the resin is not cured during passing through the die. In addition, insufficient curing of the matrix resin in the final product can be eliminated and the speed of pultrusion can be increased.

Further, Japanese Patent Laid-open Publication No. 2008-508113 (claims) discloses a continuous pultrusion method in which a fabric sheet impregnated with a resin composition is heated to partially react an epoxy resin and a curing agent, thereby increasing the viscosity of the resin composition, and then gelation is performed by using heat or pressure, and further discloses a pultrusion method in which the partial reaction is performed until a viscosity in the range of 1000 to 10000 mPa·s is achieved, the gelation is performed to a degree of cure of 40% to 75%, and curing is performed up to a degree of crosslinking of 90% or more by heat. JP '113 discloses an epoxy resin composition comprising at least one epoxy resin which is a tri- or tetra-functional epoxy resin, and (ii) a curing agent system containing at least two reactive groups differing in reactivity.

However, the configuration of JP '938 has a problem in the heat resistance of a resulting shaped article. In addition, since curing shrinkage occurs when transitioning to a solid state during the passage through the die, it is difficult to completely suppress scale by this configuration.

The epoxy resin composition of JP '317 is produced by a liquid process such as a filament winding process, and the gist thereof is to improve the permeability into the reinforcing fiber bundle. Even with that configuration, it was difficult to completely suppress scale.

According to the configuration of JP '812, using methylnadic anhydride singly as an acid anhydride-based curing agent led to a problem in low viscosity for improving the permeability into the reinforcing fiber bundle. In addition, singly using hydrophthalic anhydride led to a problem in heat resistance. Even with that configuration, it was difficult to completely suppress scale.

The object of the method of JP '381 was to avoid that the fiber-reinforced resin composition is easily pultruded in an uncured state and suppress the occurrence of cracks and warpage defects of the shaped article caused by a rapid curing reaction. Even with that configuration, it was difficult to completely suppress generation of scale.

The method of JP '659 has been premised on curing the thermosetting matrix resin during the course of passing it through the die while continuously performing pultrusion. The after-curing was used for the purpose of supplementing the curing of the resin in an insufficiently cured state where the curing did not proceed completely. That is, in that method, curing shrinkage that occurs when transitioning to the solid state occurs during the passage through the die and, therefore, it was difficult to completely suppress the generation of scale.

The epoxy resin composition used in the method of JP '113 uses a curing agent containing at least two types of reactive groups having different reactivities, has a large degree of variation in the degree of cure, and can control the reaction. It was complicated. For this reason, it has been difficult to stably perform pultrusion at high speed. Further, it has been difficult to completely suppress the generation of scale by suppressing the occurrence of curing shrinkage during the passage through the die.

It could therefore be helpful to, in the step of producing a fiber-reinforced shaped article in a pultrusion process, suppress generation of a resin residue called scale, that is, the phenomenon that when a thermosetting resin composition is cured from a liquid state to transition to a solid state, a part of the resin component adheres and remains on the inner surface of the pultrusion die. This could make it possible to avoid an increase in the pultruding force during the production process and perform pultrusion continuously at high speed.

SUMMARY

We thus provide:

A fiber-reinforced shaped article in which a reinforcing fiber bundle aggregate formed of a plurality of reinforcing fiber bundles converged is impregnated with an epoxy resin composition and the epoxy resin composition is cured, wherein the epoxy resin composition contains at least components [A], [B], [C], and [D], and a quantity of [A] is 60 to 100 parts by mass per 100 parts by mass of all epoxy resin contained in the epoxy resin composition:

[A]: aminophenol type epoxy resin;
[B]: two kinds of acid anhydrides of
  [B1]: acid anhydride having a nadic anhydride structure, and
  [B2]: acid anhydride having a hydrogenated structure of phthalic anhydride;
[C]: at least one filler having a Mohs hardness of 3 or less, selected from a silicon compound, a magnesium compound, a calcium compound, an aluminum compound, and inorganic carbon;
[D]: a release agent.

A method produces a fiber-reinforced shaped article, wherein a resin-impregnated fiber base material in which a reinforcing fiber bundle aggregate formed of converged reinforcing fiber bundles is impregnated with an epoxy resin composition is passed through a pultrusion region and simultaneously the epoxy resin composition is heat-cured, whereby the resin-impregnated fiber base material is pultruded into a prescribed shape, wherein the epoxy resin composition contains at least components [A], [B], [C], and [D], and a quantity of [A] is 60 to 100 parts by mass per 100 parts by mass of all epoxy resin contained in the epoxy resin composition:

[A]: aminophenol type epoxy resin;
[B]: two kinds of acid anhydrides of
  [B1]: acid anhydride having a nadic anhydride structure, and
  [B2]: acid anhydride having a hydrogenated structure of phthalic anhydride;
[C]: at least one filler having a Mohs hardness of 3 or less, selected from a silicon compound, a magnesium compound, a calcium compound, an aluminum compound, and inorganic carbon;
[D]: a release agent.

An epoxy resin composition contains an epoxy resin.

It comprises at least components [A], [B], [C] and [D].

The component [A] accounts for 60 to 100 parts by mass per 100 parts by mass of all epoxy resins contained in the epoxy resin composition.

[A]: aminophenol type epoxy resin
[B]: two kinds of acid anhydrides of
  [B1]: acid anhydride having a nadic anhydride structure, and
  [B2]: acid anhydride having a hydrogenated structure of phthalic anhydride

[C]: at least one filler having a Mohs hardness of 3 or less, selected from a silicon compound, a magnesium compound, a calcium compound, an aluminum compound, and inorganic carbon

[D]: a release agent

Preferably, 50 to 90 parts by mass of the component [B1] and 50 to 10 parts by mass of the component [B2] are included in 100 parts by mass of the component [B], and the content of the component [B] per 100 parts by mass of the component [A] is 50 to 200 parts by mass.

Preferably, the component [C] is particulate talc and has an average particle diameter defined by a laser diffraction type particle size distribution analyzer of 2 to 7 μm.

Preferably, the component [D] is contained in an amount of 0.1 to 8 parts by mass per 100 parts by mass of the component [A].

Preferably, 0.1 to 5 parts by mass of an imidazole derivative is further blended as the component [E] per 100 parts by mass of the component [A].

A method produces a fiber-reinforced shaped article, wherein a resin-impregnated fiber base material in which a reinforcing fiber bundle aggregate formed of converged reinforcing fiber bundles is impregnated with a thermosetting resin composition is passed through a pultrusion region and simultaneously the thermosetting resin composition is heat-cured, whereby the resin-impregnated fiber base material is pultruded into a prescribed shape, wherein in the pultrusion region, at least a pultrusion die having an inlet part and an outlet part, and an after-cure furnace are arranged, in the pultrusion region, a process in which the resin-impregnated fiber base material is introduced from the inlet part of the pultrusion die, passed through the inside of the die, pulled out from the outlet part of the die, and then passed through the after-cure furnace is carried out, and conditions (i) to (v) are satisfied in the pultrusion region, (i) Formulae (1) to (3) are satisfied where the pultrusion die temperature is denoted by Tp (° C.) and the in-die residence time calculated by dividing the path length of the resin-impregnated fiber base material in the die (-"die path length") (m) by the shaping speed (m/min) is denoted by H (min), $$230-100H \leq Tp \leq 252-80H \quad (1)$$

$$180 \leq Tp \leq 245 \quad (2)$$

$$0.1 \leq H \leq 0.9 \quad (3)$$

(ii) the thermosetting resin composition is kept in a liquid state at the inlet part of the pultrusion die, (iii) the thermosetting resin composition transitions from a liquid state to a gelled state in the die, (iv) the thermosetting resin composition maintains a gelled state with a degree of cure of 33 to 80% at the die outlet part, (v) the thermosetting resin composition is in a cured state with a degree of cure of 95% or more in the after-cure furnace.

The "path length of the base material" is the distance through which the resin-impregnated fiber base material passes in the die, and the "shaping speed (m/min)" is the moving speed of the base material per minute during the shaping.

Preferably, relating to the above-mentioned production method, the region where the thermosetting matrix resin composition starts to transition to a gelled state in the pultrusion die lies within a region distancing by a length of 10 to 50% of the die path length from the outlet part of the path.

Preferably, relating to the above-mentioned production method, the resin-impregnated fiber base material is heated in the after-cure furnace while being in non-contact with a heating element.

With the epoxy resin composition having the features, generation of scales that occurs inside the die during pultrusion can be suppressed. Further, since the resin composition slightly changes in viscosity during pultrusion, can maintain low pultrusion force for a long period of time, and is superior in curability, it can realize continuous pultrusion at a high speed. Further, the epoxy resin composition has a viscosity as low as it can sufficiently soak and cured products thereof are superior in heat resistance.

Further, relating to a production method characterized by the relationship between the die temperature and the in-die residence time, by holding the thermosetting resin composition in a gelled state in a pultrusion die to achieve a degree of cure within a fixed range, and the degree of cure within a certain range, it is possible to suppress the occurrence of curing shrinkage that occurs when the thermosetting matrix resin cures from a liquid state and transitions to a solid state, and it is possible to suppress the occurrence of so-called scales that adheres and remains on the inner surface of the pultrusion die so that it is possible to realize continuous high-speed pultrusion.

BRIEF DESCRIPTION OF THE DRAWINGS

FIG. 1 is a schematic view of a pultrusion machine for pultruding the fiber-reinforced shaped article.

FIG. 2 is an enlarged sectional view of a pultrusion die part.

FIGS. 3(a)-3(c) are cross-sectional views showing a process in which the thermosetting resin composition in the pultrusion die cures and shrinks from a gelled state.

FIG. 4 is a side sectional view showing that the gelled state of the thermosetting resin composition is controlled in the pultrusion.

FIG. 5 is a diagram showing a relationship between an in-die residence time and a die temperature that gives a defective cure region and a scale generation region of the thermosetting resin composition in the pultrusion.

DESCRIPTION OF REFERENCE SIGNS

1: Pultrusion process
2: Reinforcing fiber bundle
3: Creel
4: Resin bath
5: Squeeze
6: Pultrusion die
7: Resin-impregnated fiber base material
8: Winder
9: Enlarged part
10: Puller
11: Inlet part of die
12: Outlet part of die
13: Scale deposition site
14: Liquid region
15: Gelled region
16: Solid region
17: Pultrusion region
18: Pultrusion direction
20: Thermosetting resin composition in gelled state 21: Surface layer part transitioning to a thermosetting resin cured state
22: The state where the thermosetting resin was cured to the inside and curing shrinkage occurred
23: Sites without scale deposition
24: After-cure furnace
25: Defective cure region
26: Appropriate condition region
27: Scale generation region
28: Characteristic line of a degree of cure of 33%
29: Characteristic line of a degree of cure of 80%
30: Guide

DETAILED DESCRIPTION

Hereinafter, examples will be described with reference to the drawings. This disclosure is not limited to the drawings or working examples.

The "epoxy resin" refers to a compound having two or more epoxy groups in one molecule. Further, a mixture of materials necessary for polymerization or curing reaction is referred to as an "epoxy resin composition," and a mixture cured by polymerization or crosslinking is referred to as a "cured epoxy resin," a "cured product of an epoxy resin composition" or a "cured product."

The epoxy resin composition suitable for obtaining the fiber-reinforced shaped article has the following constitution.

It is an epoxy resin composition containing an epoxy resin.

It comprises at least components [A], [B], [C] and [D].

The component [A] accounts for 60 to 100 parts by mass per 100 parts by mass of all epoxy resins contained in the epoxy resin composition.
[A]: aminophenol type epoxy resin
[B]: two kinds of acid anhydrides of
  [B1]: acid anhydride having a nadic anhydride structure, and
  [B2]: acid anhydride having a hydrogenated structure of phthalic anhydride
[C]: at least one filler having a Mohs hardness of 3 or less, selected from a silicon compound, a magnesium compound, a calcium compound, an aluminum compound, and inorganic carbon
[D]: a release agent Of 100 parts by mass of all epoxy resin contained in the epoxy resin composition, 60 to 100 parts by mass, preferably 80 to 100 parts by mass, of the aminophenol type epoxy resin [A] is used so that the epoxy resin composition has a reduced viscosity and the heat resistance of a fiber-reinforced shaped article is enhanced.

The aminophenol type epoxy resin refers to a resin having an epoxy group via an oxygen atom directly bonded to a benzene ring and further a carbon atom and having an epoxy group via a nitrogen atom directly bonded to a benzene ring and further a carbon atom. It is common that the aminophenol type epoxy resin has one group of the former epoxy group and two groups of the latter epoxy group.

The viscosity of the aminophenol type epoxy resin at 25° C. is preferably 500 to 7,000 mPa·s.

The viscosity referred to herein is determined at 25° C. by a measuring method using a cone-plate type rotary viscometer in ISO 2884-1 (1999).

When the viscosity at 25° C. of the aminophenol type epoxy resin is less than 500 mPa·s, the heat resistance of a resulting epoxy resin composition may be lowered. If the viscosity at 25° C. is higher than 7,000 mPa·s, the viscosity of the resulting epoxy resin composition may be excessively high.

Examples of the aminophenol type epoxy resin having a viscosity of 500 to 7,000 mPa·s at 25° C. include "jER" (registered trademark) 630 (manufactured by Mitsubishi Chemical Corporation), "Araldite" (registered trademark) MY0500 (manufactured by Huntsman Advanced Material), and "Araldite" (registered trademark) MY0510. One example of the structure of the aminophenol type epoxy resin is shown below.

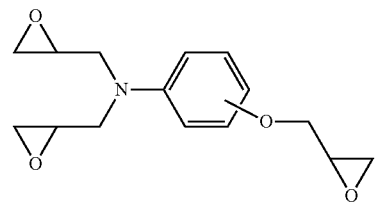

An acid anhydride is used as a curing agent. The acid anhydride includes an acid anhydride [B] composed of two kinds, [B1] an acid anhydride having a nadic anhydride structure and [B2] an acid anhydride having a hydrogenated structure of phthalic anhydride.

The "nadic anhydride structure" in the component [B1] includes nadic anhydride, that is, bicyclo[2.2.1]hept-5-ene-2,3-dicarboxylic anhydride itself, but is not limited to this, and also includes a structure in which an atom contained in nadic anhydride is substituted with a functional group. Examples thereof include compounds in which hydrogen bonded to carbon is replaced by a functional group, and one of preferable compounds is methylnadic anhydride. In addition, one having a structure in which hydrogen bonded to an atom contained in nadic anhydride has been substituted with a functional group as a part of a ring structure is also applicable as long as it can act as the curing agent of the component [A].

Specific examples thereof include nadic anhydride and methylnadic anhydride, and in particular, the component [B1] is preferably methylnadic anhydride.

Further, the component [B2], namely, an acid anhydride having a hydrogenated structure of phthalic anhydride is an acid anhydride having a chemical structure of a hydrogenated phthalic anhydride. The component [B2] includes such hydrogenated phthalic anhydride itself, but is not limited to this, and also includes a structure in which an atom contained in the hydrogenated phthalic anhydride is replaced by a functional group. Examples thereof include compounds in which hydrogen bonded to carbon is replaced by a functional group, and preferred compounds include tetrahydromethylphthalic anhydride and hexahydromethylphthalic anhydride. Further, a compound having a structure in which an atom contained in nadic anhydride is substituted with a functional group in a part of the ring structure is also applicable as long as it can act as the curing agent of the component [A].

Specific examples of the component [B2] include tetrahydrophthalic anhydride, methyltetrahydrophthalic anhydride, hexahydrophthalic anhydride, methylhexahydrophthalic anhydride, and trialkyltetrahydrophthalic anhydrides. Particularly, the component [B2] is preferably tetrahydromethylphthalic anhydride or hexahydromethylphthalic anhydride. As the content ratios of the component [B1] and the component [B2], 100 parts by mass of the acid anhydride

[B], that is, [B1] and [B2], preferably contains 50 to 90 parts by mass of the component [B1] and 50 to 10 parts by mass of the component [B2].

Preferably, the content of the component [B1] is 55 to 85 parts by mass and the content of the component [B2] is 45 to 15 parts by mass. More preferably, the content of the component [B1] is 60 to 80 parts by mass and the content of the component [B2] is 40 to 20 parts by mass. Even more preferably, the content of the component [B1] is 70 to 75 parts by mass and the content of the component [B2] is 30 to 25 parts by mass.

By including 50 to 90 parts by mass of the component [B1] in 100 parts by mass of the acid anhydride [B], the cured product obtained from the epoxy resin composition can have high heat resistance. When the content of the component [B1] is less than 50 parts by mass, the heat resistance of the fiber-reinforced shaped article may be low.

By including 50 to 10 parts by mass of the component [B2] in 100 parts by mass of the acid anhydride [B], the initial viscosity of the epoxy resin composition can be suppressed low and the curing speed can be improved. When the content of the component [B2] is less than 10 parts by mass, the resin composition may have poor initial low viscosity.

The viscosity of the component [B2] at 25° C. is preferably 20 mPa·s or more and 1,000 mPa·s or less. The viscosity referred to herein is determined at 25° C. by a measuring method using a cone-plate type rotary viscometer in ISO 2884-1 (1999).

Examples of commercially available methylnadic anhydrides include "KAYA-HARD" (registered trademark) MCD (viscosity: 250 mPa·s, manufactured by Nippon Kayaku Co., Ltd.) and "ARADUR" (registered trademark) HY906 (viscosity: 200 mPa·s, manufactured by Huntsman Advanced Materials). Examples of commercially available tetrahydromethylphthalic anhydride include HN-2000 (viscosity: 40 mPa·s, manufactured by Hitachi Chemical Co., Ltd.), HN-2200 (viscosity: 65 mPa·s, manufactured by Hitachi Chemical Co., Ltd.), and "ARADUR" (registered trademark) HY917 (viscosity: 75 mPa·s, manufactured by Huntsman Advanced Materials). Examples of commercially available hexahydromethylphthalic anhydrides include HN-5500 (viscosity: 65 mPa·s, manufactured by Hitachi Chemical Co., Ltd.).

The blending quantity of the acid anhydride is preferably adjusted such that the acid anhydride equivalent of the acid anhydride (the value calculated by dividing the molecular weight of the acid anhydride by the number of acid anhydride groups) per epoxy equivalent of the epoxy groups contained in all epoxy resins including the component [A] is 0.5 to 1.5 equivalents. It is more preferably 0.7 to 1.2 equivalents. Although two preferable ranges are shown, a range combining a preferable upper value and a preferable lower value may be employed. If it is less than 0.5 equivalents, the initial viscosity of the resin composition may be high or curing may insufficiently occur, whereas if it is more than 1.5 equivalents, the mechanical properties of the cured product may deteriorate.

The content of the component [B] per 100 parts by mass of the component [A] is preferably 50 to 200 parts by mass, and when the content of the component [B] is less than 50 parts by mass, the initial viscosity of the resin composition may be high or curing may insufficiently occur, whereas when it is more than 200 parts by mass, mechanical properties of the cured product may deteriorate.

In the epoxy resin composition, at least one filler having a Mohs hardness of 3 or more, selected from a silicon compound, a magnesium compound, a calcium compound, an aluminum compound, and inorganic carbon is contained as the component [C].

As the inorganic carbon, one existing in the form of an element such as graphite, or carbide such as $CaC_2$ or $SiC$ can be used. On the other hand, regarding silicon, magnesium, calcium, and aluminum, compounds containing these atoms, including substances in which these atoms exist in the form of elements, are included. Since the filler enters between the carbon fibers of the fiber base material, an effect of suppressing curing shrinkage is obtained when the resin composition is cured. When the Mohs hardness is adjusted to 3 or less, the damage to a die can be reduced because the filler is soft. Examples thereof include calcium carbonate, aluminum hydroxide, talc, and carbon black. Of these, talc (hydrous magnesium silicate ($Mg_3Si_4O_{10}(OH)_4$)), especially, particulate talc, is particularly preferably used.

Since particulate talc having an average particle diameter of 2 to 7 μm measured with a laser diffraction type particle size distribution analyzer is a particle having a small particle diameter, the talc easily penetrates between carbon fibers and the shrinkage reducing effect is further enhanced. The average particle diameter is preferably 3 to 6 μm, more preferably 3.5 to 5.5 μm. Ranges defined by combinations of any of the above upper limits and any of the lower limits are available.

The quantity of the filler [C] contained in the epoxy resin is preferably 0.5 to 5 parts by mass per 100 parts by mass of the aminophenol type epoxy resin [A].

As the release agent [D], an ester of a fatty acid with a polyhydric alcohol such as glycerin or pentaerythritol is preferable. The number of the carbon atoms of the fatty acid is preferably 12 or more. Further, it is preferably 30 or less. For example, an oleic acid ester or a stearic acid ester is preferable. Pentaerythritol tetraoleate or glyceryl isostearate can be more preferably used.

By using a release agent that is liquid at 25° C., it can be uniformly mixed in a liquid epoxy resin composition. By blending the release agent in the resin, the release property between the thermosetting resin composition and the pultrusion die 6 can be enhanced, and the pultrusion formability is improved.

The blending quantity of the release agent is preferably 0.1 to 8 parts by mass per 100 parts by mass of the aminophenol type epoxy resin [A]. More preferably, it is 0.2 to 6 parts by mass. Ranges defined by combinations of any of the above upper limits and any of the lower limits are available. When it is less than 0.1 parts by mass, sufficient releasability may not be obtained. When added in a quantity of more than 8 parts by mass, the strength of the shaped article itself may decrease, or the adhesion of the shaped article to a coating film may decrease.

As such a release agent, a liquid release agent having a viscosity at 25° C. of 50 mPa·s or more and 1,000 mPa·s or less is preferably used to suppress the influence on the viscosity of the resin composition.

Further, it is preferable that a curing catalyst [E] is contained to cure the epoxy resin. The curing catalyst is not particularly limited as long as it promotes the chemical reaction between the epoxy resin and the acid anhydride curing agent, but an imidazole derivative is preferable from the viewpoint of the balance between viscosity stability and heat resistance.

The imidazole derivative means a compound having an imidazole ring in the molecule. Specifically, it may be, but is not limited to, imidazole, 1-methylimidazole, 2-methylimidazole, 2-ethylimidazole, 2-undecylimidazole, 2-heptadecylimidazole, 2-phenylimidazole, 1,2-dimethylimidazole, 2-ethyl-4-methylimidazole, 2-phenyl-4-methylimidazole, 1-benzyl-2-phenylimidazole, 1-benzyl-2-methylimidazole, 1-cyanoethyl-2-methylimidazole, 1-isobutyl-2-methylimidazole, or 1-aminoethyl-2-methylimidazole.

Among the imidazole derivatives, imidazole derivatives having a substituent at the 1-position of the 5-membered ring are superior in stability of viscosity and are preferably used. Among them, to not increase the viscosity of the epoxy resin composition more than necessary, those having a melting point of 50° C. or less are preferably used, and imidazole derivatives having a melting point of 25° C. or less which are liquid at 25° C. are more preferably used. These imidazole derivatives may be used singly or in combination of two or more of them. Commercially available imidazole derivatives having a substituent at the 1-position include 1,2DMZ (1,2-dimethylimidazole, manufactured by Shikoku Chemicals Corporation), 1B2MZ (1-benzyl-2-methylimidazole, Shikoku Chemicals Corporation), 1B2PZ (1-benzyl-2-phenylimidazole, manufactured by Shikoku Chemicals Corporation), and DY070 (1-methylimidazole, manufactured by Huntsman Advanced Materials).

The imidazole derivative is preferably contained in 0.1 to 5 parts by mass per 100 parts by mass of the aminophenol type epoxy resin [A]. When the quantity is less than 0.1 parts by mass, the curing speed of the thermosetting resin composition may be low, and the rapid curing property may be poor. On the other hand, when the quantity is more than 5 parts by mass, the resin composition may deteriorate in viscosity stability and may not be suitable for continuous production.

Preferred examples of the reinforcing fiber to constitute the reinforcing fiber bundle include glass fiber, aramid fiber, polyethylene fiber, silicon carbide fiber, and carbon fiber. In particular, carbon fiber is preferred because it is light and high in performance and serves to produce shaped articles with good mechanical characteristics.

Carbon fibers are classified into polyacrylonitrile based carbon fibers, rayon based carbon fibers, pitch based carbon fibers and the like. Of these, polyacrylonitrile based carbon fibers, which have high tensile strength, are favorably used. A polyacrylonitrile based carbon fiber can be produced through, for example, a process as described below. A spinning solution that contains polyacrylonitrile produced from monomers mainly formed of acrylonitrile is spun by wet spinning, dry-wet spinning, dry spinning, or melt spinning. To produce carbon fiber, the coagulated thread resulting from this spinning is subjected to a yarn-making step to provide a precursor, which is then subjected to subsequent steps such as flameproofing and carbonization.

The carbon fiber to be used may be in the form of twisted yarns, untwisted yarns, or twistless yarns. In twisted yarns, the filaments in the reinforcing fiber bundles are not parallel and, accordingly, the resulting fiber reinforced composite material will tend to have poor mechanical characteristics. Therefore, untwisted yarns or twistless yarns are preferred because fiber reinforced composite material having moldability and strength characteristics in a good balance can be obtained.

When carbon fiber is used as reinforcing fiber, it is preferable that a carbon fiber bundle contain 2,000 to 70,000 filaments while the fineness per single yarn is 50 to 5,000 tex, and more preferably it contains 10,000 to 60,000 filaments while the fineness per single yarn is 100 to 2,000 tex. Ranges defined by combinations of any of the above upper limits and any of the lower limits are available. The fineness (tex) refers to the mass per 1000 m (g/1000 m) of a single yarn. It has been difficult for the conventional techniques to impregnate carbon fiber composed of 2,000 to 70,000 filaments and having a single yarn fineness of 50 to 5,000 tex with an epoxy resin composition, but the epoxy resin composition is so low in viscosity that the epoxy resin composition can penetrate into among single yarns easily.

Such carbon fiber preferably has a tensile modulus of 180 to 400 GPa. When the tensile modulus is in this range, it is possible to produce fiber reinforced composite material with rigidity, allowing lightweight shaped articles to be obtained. Although the strength of carbon fiber generally tends to decrease with an increasing elastic modulus, the carbon fiber itself can maintain strength when the elastic modulus is in this range. A more preferable elastic modulus is 200 to 370 GPa, and even more preferably 220 to 350 GPa. Ranges defined by combinations of any of the above upper limits and any of the lower limits are available. The tensile modulus of carbon fiber is measured according to JIS R7601-2006.

Examples of commercially available carbon fibers include the following:

"Torayca (registered trademark)" T300-12000 (tensile strength: 3.5 GPa, tensile modulus: 230 GPa), "Torayca (registered trademark)" T300B-12000 (tensile strength: 3.5 GPa, tensile modulus: 230 GPa), "Torayca (registered trademark)" T400HB-6000 (tensile strength: 4.4 GPa, tensile modulus: 250 GPa), "Torayca (registered trademark)" T700SC-12000 (tensile strength: 4.9 GPa, tensile modulus: 230 GPa), "Torayca (registered trademark)" T800HB-12000 (tensile strength: 5.5 GPa, tensile modulus: 294 GPa), "Torayca (registered trademark)" T800SC-24000 (tensile strength: 5.9 GPa, tensile modulus: 294 GPa), "Torayca (registered trademark)" T830HB-6000 (tensile strength: 5.3 GPa, tensile modulus: 294 GPa), "Torayca (registered trademark)" T1000GB-12000 (tensile strength: 6.4 GPa, tensile modulus: 294 GPa), "Torayca (registered trademark)" T1100GC-12000 (tensile strength: 7.0 GPa, tensile modulus: 324 GPa), "Torayca (registered trademark)" M35JB-12000 (tensile strength: 4.7 GPa, tensile modulus: 343 GPa), "Torayca (registered trademark)" M40JB-12000 (tensile strength: 4.4 GPa, tensile modulus: 377 GPa), "Torayca (registered trademark)" M3OSC-18000 (tensile strength: 5.5 GPa, tensile modulus: 294 GPa) (all of these are manufactured by Toray Industries, Inc.), PX35 (tensile strength: 4.1 GPa, tensile modulus: 242 GPa) (manufactured by Zoltek).

Next, a preferable method of producing a fiber-reinforced pultruded article will be described in conjunction with FIG. 4. A resin-impregnated fiber base material 7 prepared by impregnating converged fiber base materials with a thermosetting resin composition typified by an epoxy resin composition is passed through a distance of a pultrusion region 17. At the time of the passing, the thermosetting resin composition is heat-cured and pultruded into a prescribed shape. In a preferred production method, as shown in FIG. 4, at least a pultrusion die 6 and the after-cure furnace 24 are arranged in the pultrusion region 17. The resin-impregnated fiber base material 7 is introduced from the inlet part 11 of the pultrusion die 6, passed through the inside of the pultrusion die 6, and pulled out from the outlet part 12 of the pultrusion die 6. After that, the resin-impregnated fiber base material 7 is passed through the after-cure furnace 24. Although the thermosetting resin composition is held in the liquid state at the inlet part 11 of the die, the thermosetting resin composition in the pultrusion die 6 transitions to a gelled state. Preferably, the thermosetting resin composition is in a gelled state with a degree of cure of 33 to 80% at the outlet part 12 of the die, and is in a cured state with a degree of cure of 95% or more in the after-cure furnace 24.

FIG. 1 shows a common pultrusion process. In the pultrusion process 1, reinforcing fiber bundles 2 are pulled out from a creel 3 while being pulled by a puller 10. The reinforcing fiber bundles 2 are introduced into a resin bath 4 via a guide roll (not shown), and a thermosetting resin composition is attached thereto. Then, an excess of the thermosetting resin composition is removed by rubbing with a squeeze 5. Further, the positions of the reinforcing fibers are determined one by one by a guide 30 so that the reinforcing fibers are made to enter into a pultrusion die 6 having a desired cross-sectional shape in a well-balanced manner. The resin that cannot pass through the die together with the reinforcing fibers and eventually becomes an excess resin is backflowed from the die and drips from the inlet of the die 6 to be removed.

The resin-impregnated fiber base material 7 impregnated with the thermosetting resin composition is heated while passing through the pultrusion die 6 so that the thermosetting resin composition is cured. After being discharged from the outlet of the pultrusion die, the material is wound by the winder 8. In a preferred production method, the material passes through an after-cure furnace 24 before being wound.

Next, a situation in which the pultruding force increases in the production process of the conventional pultrusion to cause yarn breakage will be described with reference to an enlarged side cross-sectional view of the pultrusion die part of FIG. 2. The resin-impregnated fiber base material 7 is introduced from the inlet part 11 of the pultrusion die 6 and conveyed at a constant pultruding speed in the pultrusion die 6 heated to a constant temperature. The thermosetting resin composition contained in the resin-impregnated fiber base material 7 introduced from the die inlet part 11 maintains a liquid state for a while in a liquid region 14. Then, by heating from the pultrusion die 6, a part of the thermosetting resin composition starts to gel, and the gelled state region 15 continues. Then, the thermosetting resin composition of the resin-impregnated fiber base material 7 is cured to lead to a solid state, and discharged from the outlet part 12 of the die.

Details of this state are shown by cross-sectional views of the resin-impregnated fiber base material 7 of FIGS. 3(a)-3(c), taken perpendicularly to the traveling direction of the base material. FIG. 3(a) is a cross-sectional view taken along the line A-A' of FIG. 2. In FIG. 3(a), there is a thermosetting resin composition 20 in a gelled state contained in the resin-impregnated fiber base material 7 in the initial stage in the gelled region 15. FIG. 3(b) is a cross-sectional view taken along the line B-B' of FIG. 2. FIG. 3(b) shows the latter half stage of the gelled region 15 shown in FIG. 2, and the thermosetting resin composition is transitioning to the cured state 21 in the surface layer of the resin-impregnated fiber base material 7. Further, FIG. 3(c) shows a cross-sectional view taken along the line C-C' of FIG. 2. This is a stage that has reached the solid region 16, the curing of the thermosetting resin composition has proceeded to the inside of the resin-impregnated fiber base material 7, and there is a state 22 in which curing shrinkage has occurred. During the curing shrinkage, a part of the resin component adheres to and remains on the inner surface of the pultrusion die so that a resin residue 13 called scale is generated and the pultrusion force increases during the production process, which causes breakage of reinforcing fibers.

On the other hand, in the method of producing a fiber-reinforced shaped article, the pultrusion die 6 and the after-cure furnace 24 are arranged in the pultrusion region 17 as illustrated in FIG. 4. The resin-impregnated fiber base material 7 is introduced from the inlet part 11 of the pultrusion die 6, passed through the inside of the pultrusion die 6, then led out from the outlet part 12 of the pultrusion die 6 without depositing scale, and then passed through the after-cure furnace 24. The place where there is no scale deposition is sign 23.

First, the resin-impregnated fiber base material 7 is introduced from the die inlet part 11. The thermosetting resin composition maintains a liquid state in the liquid region 14 in the pultrusion die 6. Then, in the pultrusion die 6, the thermosetting resin composition transitions from a gelled state 15 to a cured solid state. At the die outlet part 12, there is formed a configuration where the degree of cure at the die outlet part 12 is suppressed such that the thermosetting resin composition has a degree of cure of 33 to 80%. Thanks to this configuration, it is possible to suppress the generation of a resin residue 13 that is so-called scale that adheres and remains on the inner surface of the pultrusion die 6. The adjustment of the degree of cure can be performed by adjusting the temperature of the die, the length of the die, and the shaping speed, for example. Thanks to this configuration, it is possible to avoid the curing shrinkage of the thermosetting resin composition in the pultrusion die 6 and, as a result, possible to suppress the generation of resin residue 13 called scale on the inner surface of the pultrusion die 6. Furthermore, the resin-impregnated fiber base material 7 discharged from the die outlet part 12 is introduced into the after-cure furnace 24 and heated in the furnace 24, and thus the thermosetting resin composition forms a cured state with a degree of cure of 95% or more so that a pultruded article can be produced.

If the degree of cure of the thermosetting resin composition is less than 33% at the outlet part 12 of the die, defective cure may occur. Further, if the degree of cure of the thermosetting resin composition exceeds 80% at the die outlet part 12, it may be difficult to suppress the generation of resin residue 13 called scale in the pultrusion die 6.

At the outlet part 12 of the die, the degree of cure of the thermosetting resin composition is preferably 33 to 80%, more preferably 50 to 79%, even more preferably 60 to 79%, and particularly preferably 76 to 77%. Ranges defined by combinations of any of the above upper limits and any of the lower limits are available.

In the shaping stage, appropriate quantities of the shaped articles discharged from the die and the after-cure furnace are sampled, and the residual heat generation is determined from the heat generation peak produced by DSC measurement (differential scanning calorimetry). Then, from the ratio of this amount of heat generation to the amount of heat generation of the resin composition determined from the heat generation peak produced by DSC measurement of the uncured resin composition in advance, the degree of cure can be determined using the following formula:

Degree of cure=100−(calorific value of shaped article)/(calorific value of resin composition× mass fraction of thermosetting resin in shaped article).

Further, the viscosity of the thermosetting resin composition at the pultrusion die inlet part 11 is preferably 3000 mPa·s or less. Thanks to this configuration, the fiber base material 2 can be satisfactorily and continuously impregnated with the thermosetting resin composition, and the liquid state of the resin-impregnated fiber base material 7 can be favorably maintained in the pultrusion die 6. The viscosity is preferably 2000 mPa·s or less, more preferably 1000 mPa·s or less.

The following formulae are preferably satisfied where the temperature of the pultrusion die 6 is Tp (° C.) and the in-die residence time calculated by dividing the length (m) of the path length of the resin-impregnated fiber base material in the pultrusion die 6 (–"die path length") by the shaping speed (m/min) is H (min), $$230-100H \le Tp \le 252-80H$$

$$180 \le Tp \le 245$$

$$0.1 \le H \le 0.9.$$

The die temperature Tp is the temperature of the path of the resin-impregnated fiber base material in the pultrusion die. This is preferably measured by inserting a thermocouple during the pultrusion process. However, since it is difficult to measure the temperature by this method while shaping, another method is preferable in which a thermocouple is inserted from the outside into a measurement hole opened on the side surface of the die and the temperature near the fiber base material path is measured. At this time, it is preferable to provide a plurality of measurement points and, in that example, the die temperature Tp takes an average value of the measurement points. The difference between the temperature at each measurement point and Tp is preferably within ±25° C.

The relationship of the above formula shows a range of conditions suitable for the thermosetting resin composition to maintain the gelled state with a degree of cure of 33 to 80% at the die outlet part 12.

FIG. 5 shows the relationship between the in-die residence time and the die temperature in the pultrusion. The vertical axis represents the die temperature Tp (° C.), and the horizontal axis represents the in-die residence time H (min). In FIG. 5, the region 25 of the thermosetting resin composition denotes a region where defective cure is likely to occur, the region 26 is an appropriate region, and the region 27 is a region where scale is likely to occur.

The characteristic line 28 shows the relationship of Tp=230–100H, the right side region 26 of which is a region where, and the region where the thermosetting resin composition can maintain a degree of cure of 33% or more at the die outlet part 12.

The characteristic line 29 shows the relationship of Tp=252–80H, the left side region 26 of which is a region where, and the region where the thermosetting resin composition can maintain a degree of cure of 80% or less at the die outlet part 12.

The heating temperature Tp of the pultrusion die 6 is 180 to 245° C. If the heating temperature Tp of the pultrusion die 6 is less than 180° C., defective cure may occur. Defective cure can be avoided by lowering the speed, but the lowering of pultrusion speed will result in an increased production cost.

Further, if the heating temperature Tp of the pultrusion die 6 exceeds 245° C., scale may easily occur. Therefore, when the speed is increased, scale generation can be suppressed, but the tension on the yarn becomes excessively strong and the yarn may be broken.

Further, the in-die residence time H is preferably 0.1 to 0.9 min, and when the in-die residence time H is less than 0.1 min, defective cure may occur. If the in-die residence time H exceeds 0.9 min, scale may easily occur.

The shaping speed is preferably 0.18 to 16 m/min. It is preferably 0.6 to 10 m/min, more preferably 1 to 8 m/min, and further preferably 1.2 to 6 m/min. Ranges defined by combinations of any of the above upper limits and any of the lower limits are available.

When the glass transition point of the thermosetting resin composition after heat-curing is Tg (° C.), it preferably satisfies the following relationship with the heating temperature Tp (° C.) of the pultrusion die 6, $$Tg-40° C. \le Tp \le Tg+25° C.$$

By setting the heating temperature Tp to (Tg–40° C.) or higher, the heat resistance of a fiber-reinforced pultruded article can be sufficiently ensured. By setting the heating temperature Tp to "Tg+25° C." or lower, it is possible to prevent the pultruded article from being deformed by heat and the thermosetting resin composition from being decomposed.

The glass transition temperature is a midpoint temperature (Tm) determined by a DSC method in accordance with JIS K7121 (1987). One example of a measuring device may be a differential scanning calorimeter DSC Q2000 (manufactured by TA Instruments, Inc.), and in this example, measurement is performed in the Modulated mode. The DSC measurement is performed at a heating rate of 5° C./min in a nitrogen gas atmosphere.

When the temperature in the after-cure furnace is Tc (° C.), it preferably satisfies the following relationship with the glass transition point Tg (° C.) of the thermosetting resin composition after heat-curing, $$Tg \le Tc \le Tg+73° C.$$

By setting the temperature Tc in the after-cure furnace to Tg or higher, the heat resistance of a resulting fiber-reinforced shaped article can be sufficiently ensured. By setting the heating temperature Tc to Tg+73° C. or lower, it is possible to prevent the shaped article from being deformed by heat of prevent the thermosetting resin composition from being decomposed.

As shown in FIG. 4, in the die 6 for pultrusion, the region where the thermosetting resin composition transitions to a gelled state is preferably a range that is a region distancing from the outlet part of the pultrusion die by a length of 10 to 50% of the entire length of the path of the resin-impregnated fiber base material in the pultrusion die. Thanks to this configuration, the degree of cure of the thermosetting resin composition around the outlet part 12 of the die is adjusted to be low, the curing shrinkage region can be shifted toward the outlet part 12 of the die so that the curing shrinkage region is shortened. It is possible to avoid the curing shrinkage of the thermosetting resin composition in the pultrusion die 6 and, as a result, possible to suppress the generation of resin residue 13 called scale on the inner surface of the pultrusion die 6. The range of the length of the above-mentioned region is preferably 15 to 45%, more preferably 20 to 40%. A range combining a preferable upper value and a preferable lower value of the two preferable ranges may be employed.

It is preferable that the resin-impregnated fiber base material 7 is heated while being in non-contact with a heating element in the after-cure furnace 24. The purpose of the after cure is to completely cure the resin of the resin-impregnated fiber base material 7 that has been passed and discharged through the pultrusion die 6. When it is in non-contact with the heating element, even if curing shrinkage occurs in the after-cure furnace, no scale adheres and remains in the furnace.

Our methods can be applied to producing fiber-reinforced shaped articles having various shapes as long as they have the same cross-sectional shape. Examples thereof include a cylindrical rod-shaped article, a polygonal-cross-sectioned rod-shaped article, a sheet-shaped thin article, and a rectangular-cross-sectioned thick article, which may be hollow. Although not particularly limited, when the thickness of the shaped article (the thickness measured from the outermost surface to the hollow portion in a hollow article) is 20 mm or less, sudden curing shrinkage due to heat storage inside the shaped article is suppressed and the dimension is often stable and, therefore, such a thickness is favorable from the viewpoint of dimensional stability.

EXAMPLES

Next, our molded articles and methods will be described with reference to the Examples and the Comparative Examples shown in Tables 1 and 2, but this disclosure is not limited to the Examples.
Raw Materials The following raw materials were used to obtain the thermosetting resin compositions that are the epoxy resin compositions of the respective examples. The units of the blending quantities in Table 1A and Table 1B each mean "parts by mass" unless otherwise specified. "–" means that the ratio is zero.

Examples 1 to 6 and Comparative Examples 1 to 5

The following raw materials were used in the Examples and Comparative Examples. The blending quantities are shown in Tables 1A and 1B.
1. Epoxy Resin
"JER" (registered trademark) 630 (p-aminophenol type epoxy resin, manufactured by Mitsubishi Chemical Corporation)
"JER" (registered trademark) 828 (bisphenol A type epoxy resin, manufactured by Mitsubishi Chemical Corporation) (not included in the category of [A]).
2. Acid Anhydride
[B1]: acid anhydride having a nadic anhydride structure
"KAYAHARD" (registered trademark) MCD (methylnadic anhydride, manufactured by Nippon Kayaku Co., Ltd.)
Component [B2]: Acid anhydride having a tetrahydrophthalic anhydride or hexahydrophthalic anhydride structure
HN-2000 (methyltetrahydrophthalic anhydride, manufactured by Hitachi Chemical Co., Ltd.)
HN-5500 (methylhexahydrophthalic anhydride, manufactured by Hitachi Chemical Co., Ltd.).
3. Filler
"Micron White" (registered trademark) #5000S (talc, average particle diameter: 4.75 μm, Mohs hardness: 1, manufactured by Hayashi Kasei Co., Ltd.) (included in the category of [C])
FB-5D (fused silica, average particle diameter: 4.7 μm, Mohs hardness 7, manufactured by Denka Co., Ltd.) (not included in the category of [C]).
4. Release Agent
"Chemlease" (registered trademark) IC-35 (oleic acid ester, manufactured by Chem-Trend L.P.) (included in the category of [D]).
5. Curing Catalyst
DY070 (1-methylimidazole, manufactured by Huntsman Advanced Materials) "CUREZOL" (registered trademark) 2E4MZ (2-ethyl-4-methylimidazole, manufactured by Shikoku Chemicals Corporation).
6. Other Substances
Metaxylylenediamine (manufactured by Mitsubishi Gas Chemical Co., Inc.).

Examples 7 to 17 and Comparative Examples 6 to 10

In these Examples and Comparative Examples, the following raw materials were used to prepare thermosetting resin compositions.
1. Epoxy Resin
"JER" (registered trademark) 630 (p-aminophenol type epoxy resin, manufactured by Mitsubishi Chemical Corporation): 95 parts by mass
"JER" (registered trademark) 828 (bisphenol A type epoxy resin, manufactured by Mitsubishi Chemical Corporation): 5 parts by mass. (Not included in the category of [A].)
2. Acid Anhydride
[B1]: acid anhydride having a nadic anhydride structure
"KAYAHARD" (registered trademark) MCD (methylnadic anhydride, manufactured by Nippon Kayaku Co., Ltd.): 119 parts by mass
[B2]: Acid anhydride having a tetrahydrophthalic anhydride or hexahydrophthalic anhydride structure
HN-5500 (methylhexahydrophthalic anhydride, manufactured by Hitachi Chemical Co., Ltd.): 51 parts by mass
3. Filler
"Micron White" (registered trademark) #5000S (talc, average particle diameter: 4.75 μm, Mohs hardness: 1, manufactured by Hayashi Kasei Co., Ltd.): 4 parts by mass. (Included in the category of [C].)
4. Release Agent
"Chemlease" (registered trademark) IC-35 (oleic acid ester, manufactured by Chem-Trend L.P.): 3 parts by mass (included in the category of [D]).
5. Curing Catalyst
"CUREZOL" (registered trademark) 2E4MZ (2-ethyl-4-methylimidazole, manufactured by Shikoku Chemicals Corporation): 2 parts by mass.
Reinforcing Fiber
"Torayca" (registered trademark) T700S-24K (carbon fiber, circular cross section, 24,000 filaments, manufactured by Toray Industries, Inc.).
(1) Preparation of Thermosetting Resin Composition
Raw materials were mixed at 25° C. in the blending ratios shown in Tables 1A and 1B in Examples 1 to 6 and Comparative Examples 1 to 5 or in the blending ratios described above in Examples 7 to 17 and Comparative Examples 6 to 10, thereby affording thermosetting resin compositions.
(2) Measurement of Viscosity of Resin Composition
According to a measuring method using a cone-plate type rotary viscometer in ISO 2884-1 (1999), the viscosity at a time one minute after the time when the epoxy resin composition was prepared was measured at 25° C. The apparatus used was a TVE-30H type manufactured by Toki Sangyo Co., Ltd. The rotor used was 1°34'×R24, and the sample quantity was 1 cm$^3$.
(3) Measurement of Glass Transition Temperature Tg of Cured Resin
Glass transition temperature was measured for a cured resin obtained by preparing an epoxy resin composition and then heat-curing it at 180° C. for 50 seconds, and a cured resin obtained by further curing that cured resin at 210° C. for 3 minutes. The measurement was performed by raising temperature under a nitrogen atmosphere at temperatures of 30 to 200° C. and a rate of 40° C./min using a Diamond DSC manufactured by PerkinElmer Inc. The midpoint glass transition temperature was taken as the glass transition point.

(4) Preparation of Pultruded Articles

Shaping was performed using the pultrusion process shown in FIG. 1. As the die 6 in FIG. 1, the pultrusion die shown in FIG. 4 was used.

As shown in FIG. 1, each resin composition was put into a resin bath 4 at 25° C., and the carbon fibers mentioned above which are the reinforcing fiber bundles 2 were passed through the resin bath 4 containing the resin composition so that the fibers were impregnated with resin. Then, the enlarged part 9 of FIG. 1 in which an excess thermosetting resin composition had been removed by rubbing with a squeeze bar 5 was expanded. Then, as shown in FIG. 4, the resin-impregnated fiber base material 7 in which the thermosetting resin composition was in a liquid state was introduced from the inlet part 11 of the die. At the time of this introduction, the thermosetting resin composition was in a liquid state. The resin-impregnated fiber base material 7 discharged from the outlet part 12 of the die was introduced into the after-cure furnace 24, and was heat-cured in the furnace 24 to obtain a pultruded article.

The shaping conditions shown in Table 1 are shown below. The shaping conditions shown in Table 2 are shown in Table 2. As the die, there was used one with a cavity having a true circular cross section of 2 mm in diameter and having a surface provided with hard chromium plating.

Heating temperature of the pultrusion die 6 Tp(° C.): 195° C.

Length of the pultrusion die 6 (total length of the path of the resin-impregnated fiber base material) (m): 800 mm Shaping speed (m/min): 1.2 (m/min)

In-die residence time H (min): 0.67 (min)

Degree of cure of the thermosetting resin composition at the die outlet part 12: 75%

Temperature in the after-cure furnace 24: 260° C.

Degree of cure of the thermosetting resin composition after the after-cure furnace 24: 95%

As a result of shaping, a pultruded article having a diameter of 2 mm and a Vf of about 70% was obtained.

At this time, in Tables 1A and 1B, the following judgment results are shown in the columns of "pultrusion" and "condition of die surface after shaping."

"Pultrusion"

When shaping was successfully and smoothly performed without generation of scale:
Good When shaping was successfully performed though scale was generated: Passing When scale was remarkably generated, or when curing did not proceed sufficiently so that the dimension was not stable and shaping failed: Failing.

"Die Surface Condition After Shaping"

The condition of the die surface after pultrusion was visually checked and judged according to the following criteria:

There is no damage such as scratches or no scale adhered: Good

There are some scratches or scale adhered: Passing

Remarkable scratches were found: Failing.

In Tables 2A and 2B, the following judgment results are shown in the columns of "deformation after pultrusion," "degree of cure at die outlet part" and "generation of scale."

"Die Outlet Deformation"

When a shaped article was pulled out from the outlet of the die, one successfully shaped without deformation was judged as good; one that deformed but was suppressed to a diameter within +−3% with respect to the cavity diameter of the die was judged as passing; and one greatly deformed, for example, expanded, more than the above criterion was judged as failing.

"Degree of Cure of Thermosetting Resin Composition at Die Outlet Part"

During the shaping, an appropriate quantity of the shaped article that came out of the die was sampled, cut into small pieces with scissors, and the residual heat generation was determined by DSC (differential scanning calorimetry). From the ratio of this amount of heat generation to the amount of heat generation of the resin composition before curing, the degree of cure α was calculated using the following formula:

Degree of cure α=100−(calorific value of shaped article)/(calorific value of resin composition× resin mass fraction of shaped article).

The DSC measurement was performed by raising the temperature at 30 to 250° C. and 10° C./min using a Diamond DSC manufactured by PerkinElmer Inc.

"Generation of Scale"

One successfully and smoothly shaped without generation of scale was expressed as being good; one successfully shaped with generation of scale was expressed as passing; and one that could not be shaped due to significant generation of scale was expressed as failing.

Example 1

As shown in Table 1A, there was prepared a resin composition made up of 100 parts by mass of an aminophenol type epoxy resin "jER" (registered trademark) 630, 135 parts by mass of acid anhydride having a nadic anhydride structure "KAYAHARD" (registered trademark) MCD, 45 parts by mass of an acid anhydride having a tetrahydrophthalic anhydride structure HN-2000, 4 parts of talc as a filler, 3 parts of an internal release agent IC-35, and 1 part of an imidazole derivative DY070. The measurement of viscosity at 25° C. in the above (2) revealed that the resin composition was suppressed to be low in viscosity. In addition, the Tg of the cured resin was sufficiently high, and this showed that the product had heat resistance. When pultrusion was carried out using this resin composition, it was successfully performed without generating scales or the like even though the shaping was performed at a high speed of 1.2 m/min. After the shaping, no scratches or scale adhesion was found on the die surface. The results are shown in Table 1A.

Example 2

The preparation of a resin composition was performed in the same manner as in Example 1, except that "jER" (registered trademark) 630, bisphenol A type epoxy resin "jER" (registered trademark) 828, "KAYAHARD" (registered trademark) MCD, and HN-2000 were used in the ratios shown in Table 1A. Although the resin composition had a slightly high viscosity measured in the above (2), it was at a level at which pultrusion was possible. In addition, the Tg of the cured resin was high, and this showed that the product had heat resistance. When pultrusion was carried out using this resin composition, shaping was successfully performed without generation of scales. After the shaping, no scratches or scale adhesion was found on the die surface. The results are shown in Table 1A.

Example 3

The preparation of a resin composition was performed in the same manner as in Example 1, except that "JER"

(registered trademark) 630, "jER" (registered trademark) 828, "KAYAHARD" (registered trademark) MCD, an acid anhydride having a hexahydrophthalic anhydride structure HN-5500, and an imidazole derivative "CUREZOL" (registered trademark) 2E4MZ were used in the ratios shown in Table 1A. The measurement of viscosity at 25° C. in the above (2) revealed that the resin composition was suppressed to be low in viscosity. In addition, the Tg of the cured resin was sufficiently high, and this showed that the product had heat resistance. When pultrusion was carried out using this resin composition, shaping was successfully performed without generation of scales. After the shaping, no scratches or scale adhesion was found on the die surface. The results are shown in Table 1A.

Example 4

The preparation of a resin composition was performed in the same manner as in Example 3, except that the ratios of "KAYAHARD" (registered trademark) MCD and HN-5500 were set as shown in Table 1A. The measurement of viscosity at 25° C. in the above (2) revealed that the resin composition was suppressed to be low in viscosity. In addition, the Tg of the cured resin was high, and this showed that the product had heat resistance. When pultrusion was carried out using this resin composition, shaping was successfully performed without generation of scales. After the shaping, no scratches or scale adhesion was found on the die surface. The results are shown in Table 1A.

Example 5

The preparation of a resin composition was performed in the same manner as in Example 3, except that the ratios of "KAYAHARD" (registered trademark) MCD and HN-5500 were set as shown in Table 1A. The resin composition had a low viscosity at 25° C. after the mixing in the above (2), but the heat resistance of the cured resin was slightly inferior. When pultrusion was performed using the resin composition, shaping was successfully carried out although some scale was generated. After the shaping, some scale adhesion to the die surface was found. The results are shown in Table 1A.

Example 6

The preparation of a resin composition was performed in the same manner as in Example 1, except that "jER" (registered trademark) 630, bisphenol A type epoxy resin "jER" (registered trademark) 828, "KAYAHARD" (registered trademark) MCD, and HN-2000 were used in the ratios shown in Table 1A. Although the resin composition had a slightly high viscosity measured in the above (2), it was at a level at which pultrusion was possible. The Tg of the cured resin was high and the heat resistance was slightly inferior. When pultrusion was performed using the resin composition, shaping was successfully carried out although some scale was generated. After the shaping, some scale adhesion to the die surface was found. The results are shown in Table 1A.

Comparative Example 1

The preparation of a resin composition was performed in the same manner as in Example 1, except that "jER" (registered trademark) 630, bisphenol A type epoxy resin "jER" (registered trademark) 828, "KAYAHARD" (registered trademark) MCD, and HN-2000 were used in the ratios shown in Table 1B. Since this resin composition contained a small amount of aminophenol type epoxy resin, the viscosity at 25° C. measured in the above (2) was high, and the Tg of the cured resin did not show sufficient heat resistance. When pultrusion was performed using the resin composition, curing did not proceed in the die due to its high viscosity and low heat resistance so that the dimensions of the shaped article were not stable. After the shaping, much scale adhesion to the die surface was found. The results are shown in Table 1B.

Comparative Example 2

The preparation of a resin composition was performed in the same manner as in Example 3, except that the ratio of "KAYAHARD" (registered trademark) MCD was set as shown in Table 1B and neither HN-2000 nor HN-5500 were blended. This resin composition had a low viscosity at 25° C. measured in the above (2), and the cured resin had a high Tg and exhibited heat resistance. Because of poor reactively, however, when pultrusion was performed using the resin composition, curing did not proceed in the die so that the dimension of the resulting shaped article was not stable. After the shaping, no scratches or scale adhesion was found on the die surface. The results are shown in Table 1B.

Comparative Example 3

The preparation of a resin composition was performed in the same manner as in Example 3 except that the filler was silica (FB-5D). The resin composition had a low viscosity at 25° C. measured in the above (2) and the cured resin had a sufficiently high Tg and showed heat resistance. When pultrusion was performed using the resin composition, shaping was successfully performed without the generation of scale or the like. After the shaping, however, significant scratches were formed on the die surface. The results are shown in Table 1B.

Comparative Example 4

The preparation of a resin composition was performed in the same manner as in Example 3 except that no release agent was included. The resin composition had a low viscosity at 25° C. measured in the above (2) and the cured resin had a sufficiently high Tg and showed heat resistance. When pultrusion was performed using this resin composition, scale was significantly generated and the shaped article itself adhered to the die so that it was difficult to perform shaping. After the shaping, much scale adhered to the die surface. The results are shown in Table 1B.

Comparative Example 5

The preparation of a resin composition was performed in the same manner as in Example 3 except that the acid anhydride and the imidazole derivative were not used and 32 parts by mass of metaxylylenediamine was used instead. The resin composition had a high viscosity at 25° C. measured in the above (2). When pultrusion was performed using this resin composition, scale was significantly generated and the shaped article itself adhered to the die so that it was difficult to perform shaping. After the shaping, much scale adhered to the die surface. The results are shown in Table 1B.

TABLE 1A

|  |  |  | Example 1 | Example 2 | Example 3 | Example 4 | Example 5 | Example 6 |
|---|---|---|---|---|---|---|---|---|
| Resin composition | Component [A] Aminophenol type epoxy resin | jER630 | 100 | 80 | 90 | 90 | 90 | 70 |
|  | Epoxy resin not included in component [A] | jER828 | — | 20 | 10 | 10 | 10 | 30 |
|  | Component [B1] Acid anhydride having a nadic anhydride structure | KAYAHARD MCD | 135 | 113 | 149 | 81 | 64 | 105 |
|  | Component [B2] Hydrogenated phthalic anhydride | HN-2000 | 45 | 38 | — | — | — | 35 |
|  |  | HN-5500 | — | — | 17 | 81 | 96 | — |
|  | Component [C] Filler | Talc (#5000S) | 4 | 4 | 4 | 4 | 4 | 4 |
|  |  | Silica (FB-5D) | — | — | — | — | — | — |
|  | Component [D] Release agent | IC-35 | 3 | 3 | 3 | 3 | 3 | 3 |
|  | Component [E] Imidazole derivative | DY070 | 1 | 1 | — | — | — | 1 |
|  |  | 2E4MZ | — | — | 2 | 2 | 2 | — |
|  | Other substances | Metaxylylene-diamine | — | — | — | — | — | — |
| Characteristics of pultruded article | Viscosity of resin composition @ 25° C. (mPa s, 1 minute after mixing) |  | 452 | 992 | 679 | 648 | 625 | 1574 |
|  | Tg of cured resin (° C.) |  | 235 | 193 | 210 | 194 | 187 | 185 |
|  | Pultrusion |  | Good | Good | Good | Good | Passing | Passing |
|  | State of die surface after shaping |  | Good | Good | Good | Good | Passing | Passing |

TABLE 1B

|  |  |  | Comparative Example 1 | Comparative Example 2 | Comparative Example 3 | Comparative Example 4 | Comparative Example 5 |
|---|---|---|---|---|---|---|---|
| Resin composition | Component [A] Aminophenol type epoxy resin | jER630 | 50 | 90 | 90 | 90 | 90 |
|  | Epoxy resin not included in component [A] | jER828 | 50 | 10 | 10 | 10 | 10 |
|  | Component [B1] Acid anhydride having a nadic anhydride structure | KAYAHARD MCD | 92 | 166 | 149 | 149 | — |
|  | Component [B2] Hydrogenated phthalic anhydride | HN-2000 | 31 | — | — | — | — |
|  |  | HN-5500 | — | — | 17 | 17 | — |
|  | Component [C] Filler | Talc (#5000S) | 4 | 4 | — | 4 | 4 |
|  |  | Silica (FB-5D) | — | — | 4 | — | — |
|  | Component [D] Release agent | IC-35 | 3 | 3 | 3 | — | 3 |
|  | Component [E] Imidazole derivative | DY070 | 1 | — | — | — | — |
|  |  | 2E4MZ | — | 2 | 2 | 2 | — |
|  | Other substances | Metaxylylene-diamine | — | — | — | — | 32 |
| Characteristics of pultruded article | Viscosity of resin composition @ 25° C. (mPa s, 1 minute after mixing) |  | 3121 | 702 | 678 | 678 | 1362 |
|  | Tg of cured resin (° C.) |  | 178 | 217 | 211 | 209 | 215 |
|  | Pultrusion |  | Failing | Failing | Good | Failing | Failing |
|  | State of die surface after shaping |  | Passing | Good | Failing | Passing | Passing |

Example 7

Using the resin composition described above, pultrusion was performed at a die temperature Tp of 200° C., a die path length of 0.6 m, and a shaping speed of 0.95 m/min. The shaped article released from the die did not deform, and the sampled shaped article had a degree of cure of 79%. No generation of scale was observed. The results are shown in Table 2A.

Example 8

Operations were performed in the same manner as in Example 7 except that the shaping speed shown in Table 2A was used. The shaped article released from the die did not deform, and the sampled shaped article had a degree of cure of 69%. No generation of scale was observed. The results are shown in Table 2A.

Example 9

Operations were performed in the same manner as in Example 7 except that the shaping speed shown in Table 2A was used. The shaped article released from the die did not deform, and the sampled shaped article had a degree of cure of 35%. No generation of scale was observed. The results are shown in Table 2A.

Example 10

Operations were performed in the same manner as in Example 7 except that the die temperature, the die path length, and the shaping speed shown in Table 2A were used. The shaped article released from the die did not deform, and the sampled shaped article had a degree of cure of 80%. Although some scale was observed, shaping was successfully and smoothly performed. The results are shown in Table 2A.

Example 11

Operations were performed in the same manner as in Example 10 except that the shaping speed shown in Table 2A was used. The shaped article released from the die did not deform, and the sampled shaped article had a degree of cure of 52%. No generation of scale was observed. The results are shown in Table 2A.

Example 12

Operations were performed in the same manner as in Example 10 except that the die path length and the shaping speed shown in Table 2A were used. The shaped article released from the die was observed to exhibit some deform but was successfully shaped, and the degree of cure of the sampled shaped article was evaluated to be 34%. No generation of scale was observed. The results are shown in Table 2A.

Example 13

Operations were performed in the same manner as in Example 7 except that the die temperature, the die path length, and the shaping speed shown in Table 2A were used. The shaped article released from the die did not deform, and the degree of cure of the sampled shaped article was evaluated to be 77%. No generation of scale was observed. The results are shown in Table 2A.

Example 14

Operations were performed in the same manner as in Example 13 except that the shaping speed shown in Table 2A was used. The shaped article released from the die did not deform, and the degree of cure of the sampled shaped article was evaluated to be 55%. No generation of scale was observed. The results are shown in Table 2A.

Example 15

Operations were performed in the same manner as in Example 13 except that the shaping speed shown in Table 2B was used. The shaped article released from the die was observed to exhibit some deform but was successfully shaped, and the degree of cure of the sampled shaped article was evaluated to be 34%. No generation of scale was observed. The results are shown in Table 2B.

Example 16

Operations were performed under the conditions shown in Table 2B using a die with a cavity having a true circular cross section of 10 mm in diameter and having a surface provided with hard chromium plating. The shaped article released from the die did not deform, and the degree of cure of the sampled shaped article was evaluated to be 60%. No generation of scale was observed. The results are shown in Table 2B.

Example 17

Operations were performed under the conditions shown in Table 2B using a die with a cavity having a rectangular cross section of 100 mm in width and 5 mm in thickness and having a surface provided with hard chromium plating. The shaped article released from the die did not deform, and the degree of cure of the sampled shaped article was evaluated to be 55%. No generation of scale was observed. The results are shown in Table 2B.

Comparative Example 6

Operations were performed in the same manner as in Example 7 except that the shaping speed shown in Table 2B was used. The shaped article released from the die did not deform, but significant scale was generated on the shaped article so that it became impossible to continue shaping half way. The degree of cure of the sampled shaped article was evaluated to be 86%. The results are shown in Table 2B.

Comparative Example 7

Operations were performed in the same manner as in Example 7 except that the shaping speed shown in Table 2B was used. The shaped article released from the die expanded in diameter and deformed. The degree of cure of the sampled shaped article was evaluated to be 12%. The results are shown in Table 2B.

Comparative Example 8

Operations were performed in the same manner as in Example 10 except that the shaping speed shown in Table 2B was used. The shaped article released from the die did not deform, but significant scale was generated on the shaped article so that it became impossible to continue shaping half way. The degree of cure of the sampled shaped article was evaluated to be 87%. The results are shown in Table 2B.

Comparative Example 9

Operations were performed in the same manner as in Example 13 except that the shaping speed shown in Table 2B was used. The shaped article released from the die did not deform, but significant scale was generated on the shaped article so that it became impossible to continue shaping half way. The degree of cure of the sampled shaped article was evaluated to be 90%. The results are shown in Table 2B.

Comparative Example 10

Operations were performed in the same manner as in Example 13 except that the shaping speed shown in Table 2B was used. The shaped article released from the die expanded in diameter and deformed. The degree of cure of the sampled shaped article was evaluated to be 13%. The results are shown in Table 2B.

inlet part of the pultrusion die, passed through the inside of the die, pulled out from the outlet part of the die, and then passed through the after-cure furnace is carried out, and

TABLE 2A

| | | Example 7 | Example 8 | Example 9 | Example 10 | Example 11 | Example 12 | Example 13 | Example 14 |
|---|---|---|---|---|---|---|---|---|---|
| Pultrusion conditions | Die temperature Tp (° C.) | 200 | 200 | 200 | 220 | 220 | 220 | 180 | 180 |
| | Die path length (m) | 0.6 | 0.6 | 0.6 | 0.8 | 0.8 | 0.6 | 0.4 | 0.4 |
| | Shaping speed (m/min) | 0.95 | 1.2 | 1.9 | 2.1 | 4 | 4.5 | 0.47 | 0.6 |
| | In-die residence time H (min) | 0.63 | 0.50 | 0.32 | 0.38 | 0.20 | 0.13 | 0.85 | 0.67 |
| Deformation after die | | Good | Good | Good | Good | Good | Passing | Good | Good |
| Degree of cure at die outlet part (%) | | 79 | 69 | 35 | 80 | 52 | 34 | 77 | 55 |
| Scale generation | | Good | Good | Good | Passing | Good | Good | Good | Good |

TABLE 2B

| | | Example 15 | Example 16 *1 | Example 17 *2 | Comparative Example 6 | Comparative Example 7 | Comparative Example 8 | Comparative Example 9 | Comparative Example 10 |
|---|---|---|---|---|---|---|---|---|---|
| Pultrusion conditions | Die temperature Tp (° C.) | 180 | 180 | 190 | 200 | 200 | 220 | 180 | 180 |
| | Die path length (m) | 0.4 | 0.5 | 0.4 | 0.6 | 0.6 | 0.8 | 0.4 | 0.4 |
| | Shaping speed (m/min) | 0.78 | 0.7 | 0.6 | 0.8 | 2.4 | 1.9 | 0.4 | 0.9 |
| | In-die residence time H (min) | 0.51 | 0.71 | 0.67 | 0.75 | 0.25 | 0.42 | 1.00 | 0.44 |
| Deformation after die | | Passing | Good | Good | Good | Failing | Good | Good | Failing |
| Degree of cure at die outlet part (%) | | 34 | 60 | 55 | 86 | 12 | 87 | 90 | 13 |
| Scale generation | | Good | Good | Good | Failing | Good | Failing | Failing | Good |

*1: Die cavity shape was different (true circle of 10 mm in diameter).
*2: Die cavity shape was different (rectangle of 100 mm in width and 5 mm in thickness).

INDUSTRIAL APPLICABILITY

The fiber-reinforced pultruded article can be effectively used for wind turbine blades, building repair and reinforcement members, electric/electronic device housings, bicycles, automobile members, structural materials for sporting-goods, aircraft interior materials, transportation boxes and the like.

The invention claimed is:

1. A method of producing a fiber-reinforced shaped article, wherein a resin-impregnated fiber base material in which a reinforcing fiber bundle aggregate formed of converged reinforcing fiber bundles is impregnated with an epoxy resin composition is passed through a pultrusion region and simultaneously the epoxy resin composition is heat-cured, whereby the resin-impregnated fiber base material is pultruded into a prescribed shape, wherein in the pultrusion region, at least a pultrusion die having an inlet part and an outlet part, and an after-cure furnace are arranged, in the pultrusion region, a process in which the resin-impregnated fiber base material is introduced from the inlet part of the pultrusion die, passed through the inside of the die, pulled out from the outlet part of the die, and then passed through the after-cure furnace is carried out, and conditions (i) to (v) are satisfied in the pultrusion region:
(i) Formulae (1) to (3) are satisfied where a pultrusion die temperature is denoted by Tp (° C.) and an in-die residence time calculated by dividing a path length of the resin-impregnated fiber base material in the die defined as die path length (m) by a shaping speed (m/min) is denoted by H (min), $$230-100H \leq Tp \leq 252-80H \quad (1)$$

$$180 \leq Tp \leq 245 \quad (2)$$

$$0.1 \leq H \leq 0.9 \quad (3);$$

(ii) the epoxy resin composition is kept in a liquid state at the inlet part of the pultrusion die;
(iii) the epoxy resin composition transitions from a liquid state to a gelled state in the die;
(iv) the epoxy resin composition maintains a gelled state with a degree of cure of 33 to 80% at the die outlet part;
(v) the epoxy resin composition is in a cured state with a degree of cure of 95% or more in the after-cure furnace,
wherein the epoxy resin composition contains at least components [A], [B], [C], and [D], and
a quantity of [A] is 60 to 100 parts by mass per 100 parts by mass of all epoxy resin contained in the epoxy resin composition:

[A]: aminophenol epoxy resin;
[B]: two acid anhydrides of
 [B1]: acid anhydride having a nadic anhydride structure, and
 [B2]: acid anhydride having a hydrogenated structure of phthalic anhydride;
[C]: at least one filler having a Mohs hardness of 3 or less, selected from the group consisting of a silicon compound, a magnesium compound, a calcium compound, an aluminum compound, and inorganic carbon;
[D]: a release agent.

2. The method according to claim 1, wherein the resin-impregnated fiber base material is heated in the after-cure furnace while not being in contact with a heating element.

3. The method according to claim 1, wherein the fiber-reinforced shaped article is used for an electric cable core application.

4. A method of producing a fiber-reinforced shaped article, wherein a resin-impregnated fiber base material in which a reinforcing fiber bundle aggregate formed of converged reinforcing fiber bundles is impregnated with a thermosetting resin composition is passed through a pultrusion region and simultaneously the thermosetting resin composition is heat-cured, whereby the resin-impregnated fiber base material is pultruded into a prescribed shape,
 wherein in the pultrusion region, at least a pultrusion die having an inlet part and an outlet part, and an after-cure furnace are arranged,
 in the pultrusion region, a process in which the resin-impregnated fiber base material is introduced from the inlet part of the pultrusion die, passed through the inside of the die, pulled out from the outlet part of the die, and then passed through the after-cure furnace is carried out, and
conditions (i) to (v) are satisfied in the pultrusion region:
 (i) Formulae (1) to (3) are satisfied where a pultrusion die temperature is denoted by $T_p$ (° C.) and an in-die residence time calculated by dividing a path length of the resin-impregnated fiber base material in the die defined as die path length (m) by a shaping speed (m/min) is denoted by H (min), $$230-100H \leq T_p \leq 252-80H \quad (1)$$

$$180 \leq T_p \leq 245 \quad (2)$$

$$0.1 \leq H \leq 0.9 \quad (3);$$

(ii) the thermosetting resin composition is kept in a liquid state at the inlet part of the pultrusion die;
 (iii) the thermosetting resin composition transitions from a liquid state to a gelled state in the die;
 (iv) the thermosetting resin composition maintains a gelled state with a degree of cure of 33 to 80% at the die outlet part;
 (v) the thermosetting resin composition is in a cured state with a degree of cure of 95% or more in the after-cure furnace.

5. The method according to claim 4, wherein, in the die, a region where the thermosetting resin composition starts to transition to a gelled state lies within a region distancing from the die outlet part by a length of 10 to 50% of the die path length.

6. The method according to claim 4, wherein the resin-impregnated fiber base material is heated in the after-cure furnace while not being in contact with a heating element.

7. The method according to claim 4, wherein the fiber-reinforced shaped article is used for an electric cable core application.

* * * * *